April 6, 1937.  R. BOWDEN  2,076,172
APPARATUS FOR SPRAYING A CENTER STRIPE ON HIGHWAYS
Filed Oct. 7, 1935  5 Sheets-Sheet 1
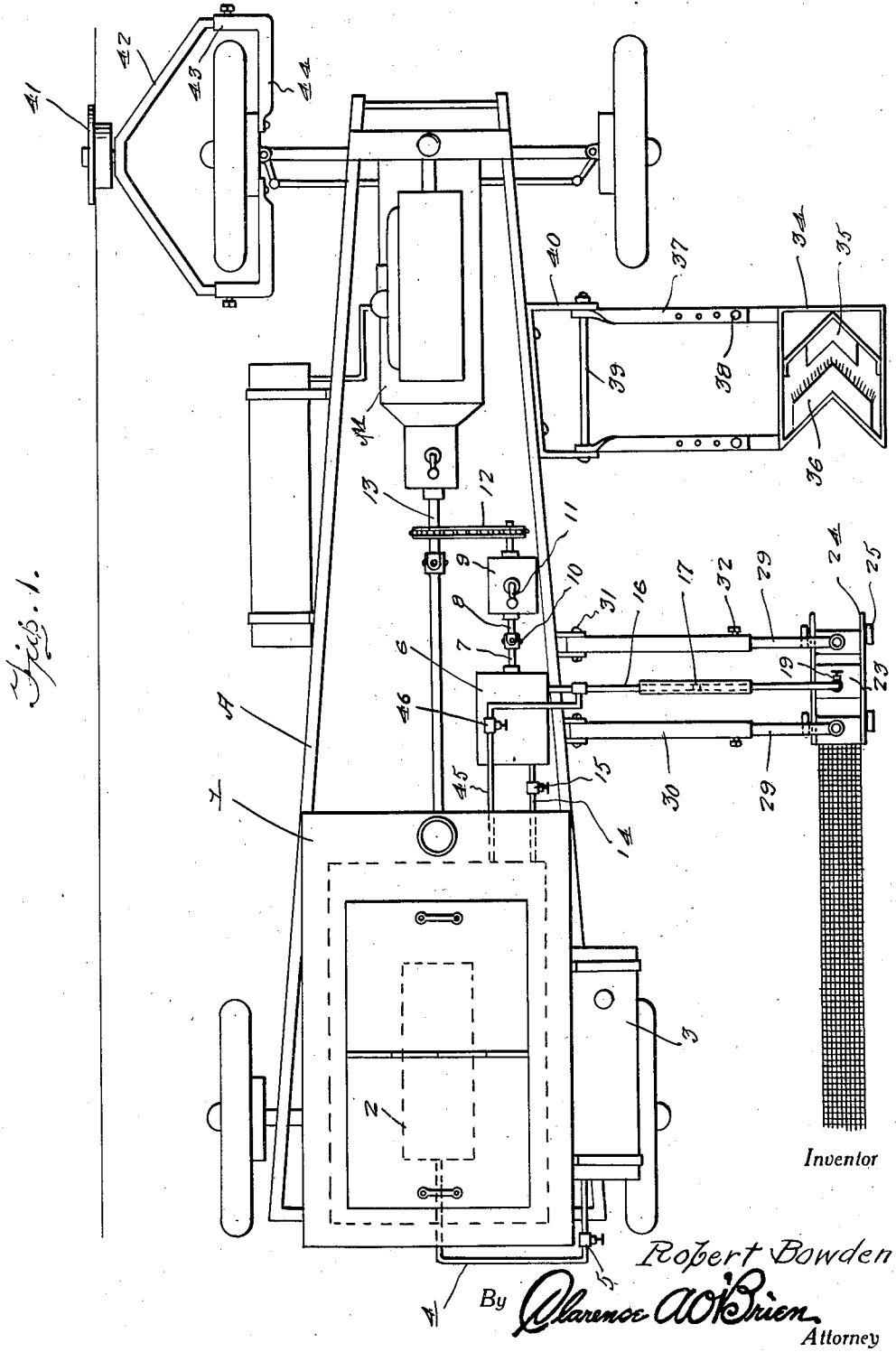
Inventor
Robert Bowden
By Clarence A. O'Brien
Attorney April 6, 1937. R. BOWDEN 2,076,172
APPARATUS FOR SPRAYING A CENTER STRIPE ON HIGHWAYS
Filed Oct. 7, 1935 5 Sheets-Sheet 2
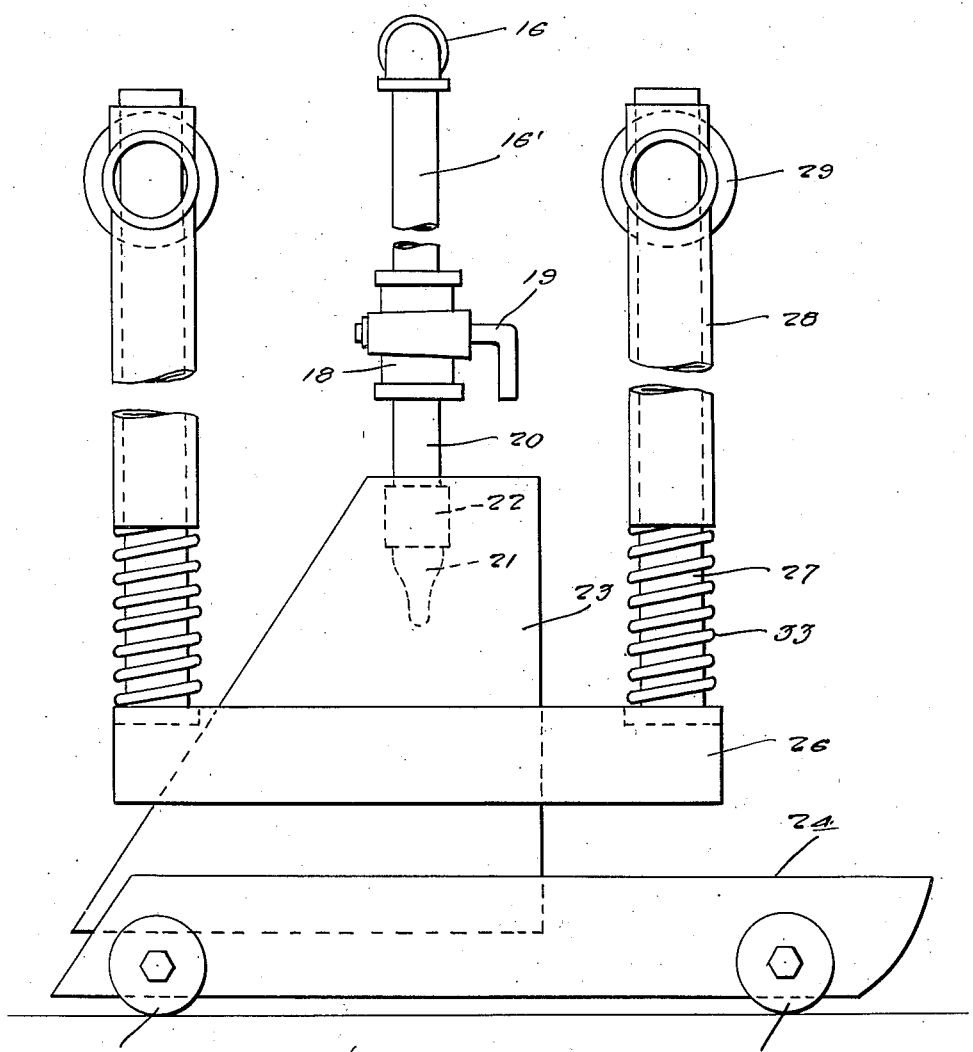
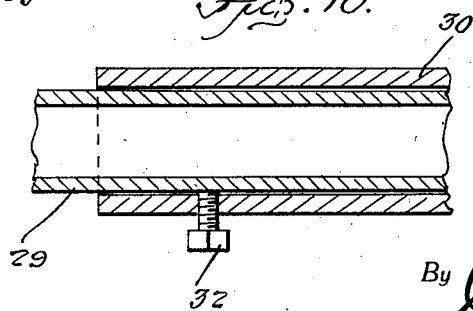
Inventor
Robert Bowden
By Clarence A O'Brien
Attorney

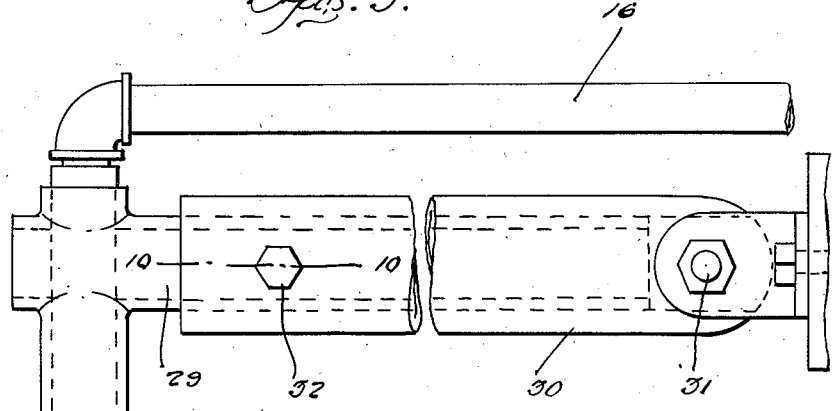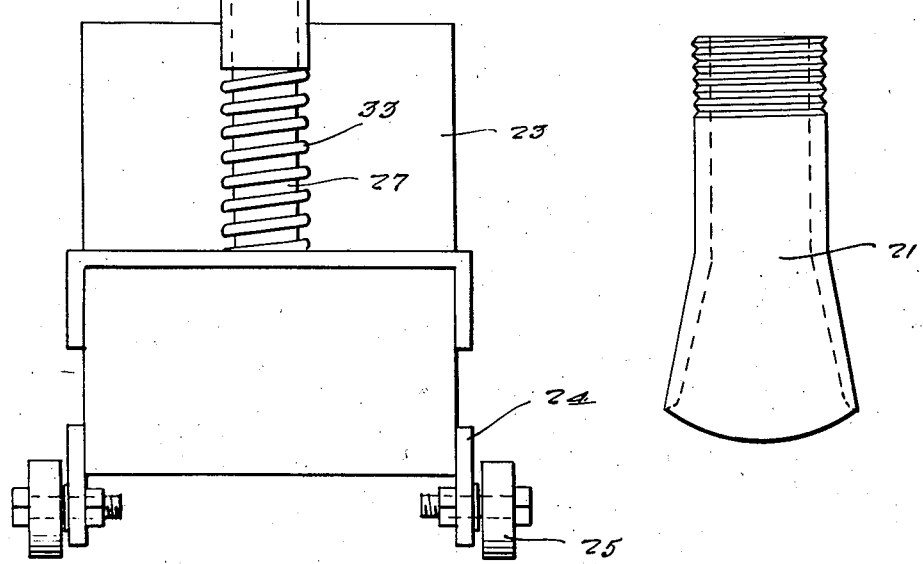

April 6, 1937.　　　R. BOWDEN　　　2,076,172
APPARATUS FOR SPRAYING A CENTER STRIPE ON HIGHWAYS
Filed Oct. 7, 1935　　　5 Sheets-Sheet 4

Inventor
Robert Bowden
By Clarence A. O'Brien
Attorney

April 6, 1937.  R. BOWDEN  2,076,172
APPARATUS FOR SPRAYING A CENTER STRIPE ON HIGHWAYS
Filed Oct. 7, 1935   5 Sheets-Sheet 5
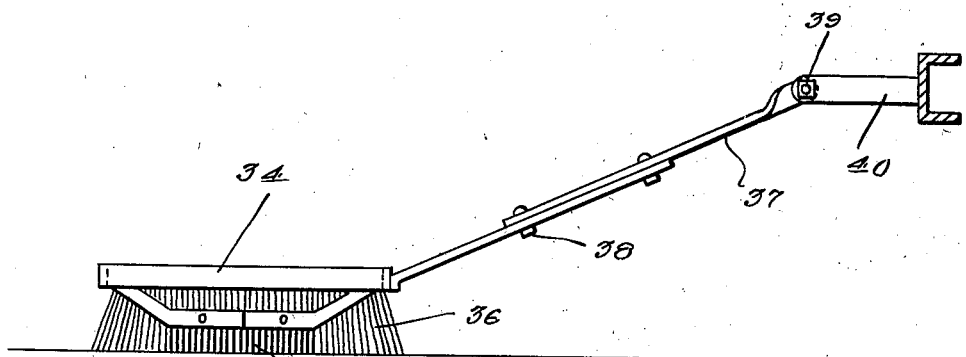
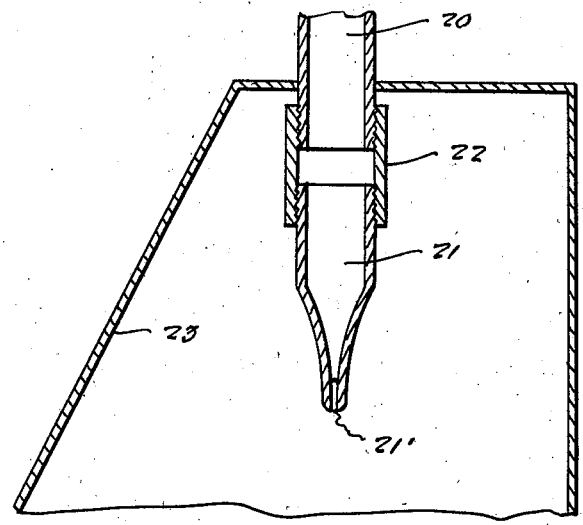
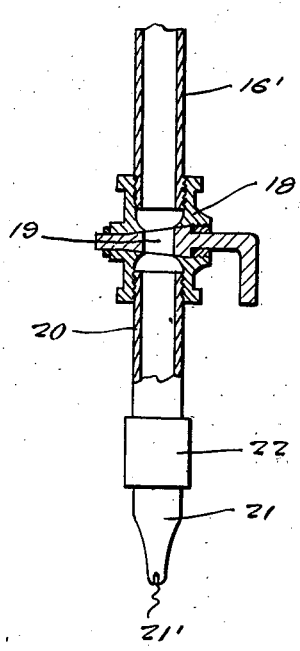
Inventor
Robert Bowden
By Clarence A. O'Brien
Attorney Patented Apr. 6, 1937

2,076,172

UNITED STATES PATENT OFFICE 2,076,172

APPARATUS FOR SPRAYING A CENTER STRIPE ON HIGHWAYS

Robert Bowden, Robstown, Tex., assignor to V. W. Payton, Bell County, Tex.

Application October 7, 1935, Serial No. 43,951

2 Claims. (Cl. 91—44)

This invention relates to an apparatus for spraying a center stripe on highways, the general object of the invention being to provide means carried by a motor vehicle, whereby asphalt or the like can be sprayed with a stripe at the center of the highway very easily and quickly, with means for making adjustments to suit highways of different widths.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a top plan view, showing the apparatus in use.

Figure 2 is a view looking toward the outer side of the spraying carriage and the parts carried thereby.

Figure 3 is a view looking toward the front of Figure 2.

Figure 6 is a fragmentary vertical sectional view through the nozzle and the casing for closing the same.

Figure 7 is a vertical sectional view through the pipe leading to the nozzle and the valve in the pipe.

Figure 8 is a front view of the brush assembly.

Figure 9 is a front view of the nozzle.

Figure 10 is a section on line 10—10 of Figure 3.

Figure 4:
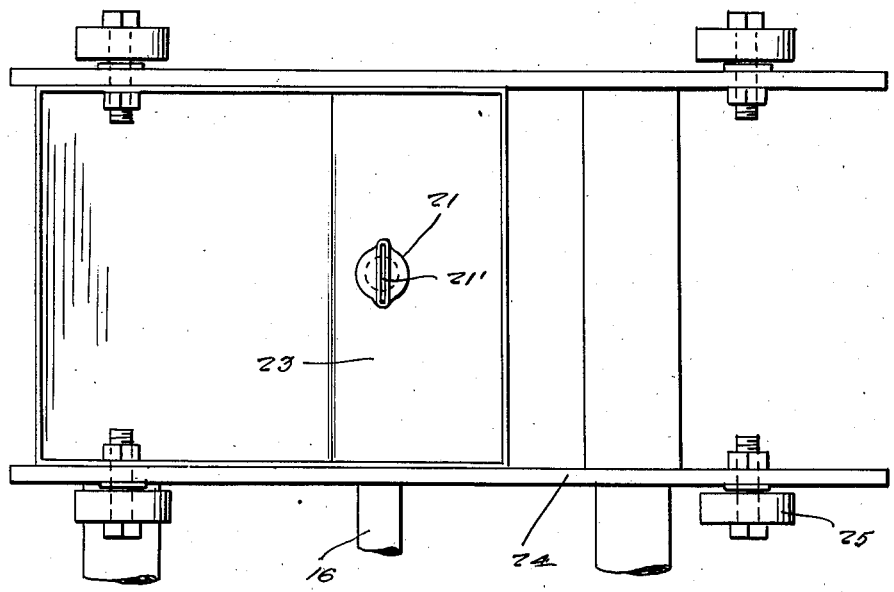
Figure 4 is a bottom plan view of the carriage.
Figure 5:
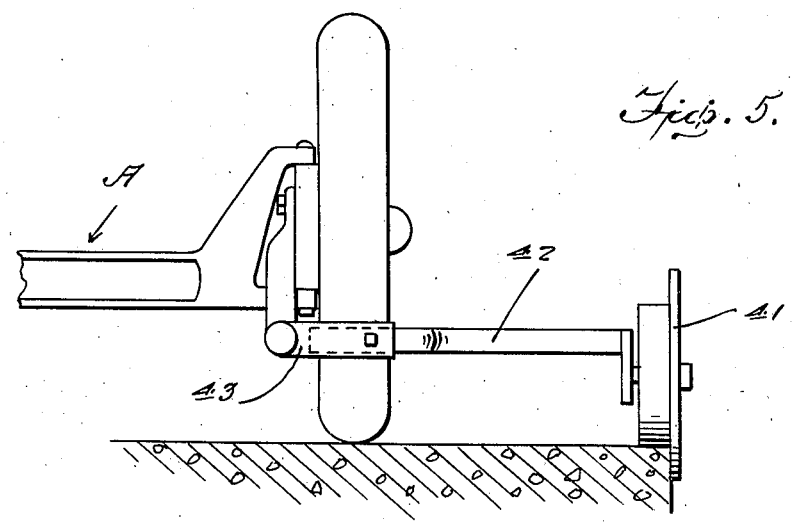
Figure 5 is a fragmentary view showing the guiding means for guiding the vehicle from one side edge of the pavement.

In these drawings, the letter A indicates the chassis of a motor vehicle, which supports a tank 1 for asphalt or the like and which is heated by a burner 2 supplied with liquid fuel from a tank 3 through means of a pipe 4 containing a control valve 5. A pump 6 has its shaft 7 connected to the shaft 8 of transmission means 9 by a universal joint 10, the transmission lever being shown at 11. This transmission is driven by chain and sprocket means 12 from the shaft 13 leading from the power plant M of the motor. The pump is connected by a pipe 14 with the tank 1, and this pipe contains a control valve 15. A pipe 16 is connected to the outlet of the pump and is adjustable as to its length, as shown generally at 17, the pipe having a depending part 16' at its outer end which is connected with a valve casing 18 containing a valve 19 and which in turn is connected by a pipe 20 to a nozzle 21 by means of a sleeve 22, as shown more particularly in Figures 6 and 7. The nozzle 21 of the sleeve 22 is located in a vertical casing 23 of substantially rectangular shape, but having a downwardly and rearwardly sloping rear wall, as shown in Figure 2, and the nozzle is formed as shown at 21', to give a fan-shaped spray, and is arranged at right angles to the direction of travel of the apparatus.

Runner-like bars 24 are attached to the sides of the lower part of the casing 23 and carry the ground engaging wheels 25, and longitudinally extending bars 26 are attached to said sides of the casing above the bars 24, and have the posts 27 connected to their ends. These posts 27 telescope into the tubular posts 28 having their upper ends connected to the horizontal bars 29, which telescope into the horizontal tubular members 30 which are pivoted to swing in vertical planes on a side member of the chassis, as shown at 31. The bars 29 are held in adjusted position in the tubular members 30 by the set screws 32. Springs 33 on the posts 27 bear against the bars 26 and the tubular members 28 and tend to hold the wheels 25 against a surface in a yielding manner and also to act as shock absorbers.

As will be seen, the casing 23, with the parts associated therewith, can be adusted toward and away from the motor vehicle, and the springs 33 will hold the wheels upon the road surface with the nozzle spaced the correct distance from said surface.

In order to clean the center of the highway before the material is applied, I provide a brush frame 34 which carries the wire brushes 35 at its front end and the fibre brushes 36 at its rear end, the frame being supported by the arms 37 adjustable as to their length, as shown at 38, and pivoted at their inner ends on a rod 39 carried by a frame 40 attached to the same side bar of the chassis as are the arms or parts 30, so that said brushes will clean the center of the highway before the material is sprayed thereon by the nozzle. As will be seen, the frame 34 and the arms 37 can be swung upwardly when not in use.

In order to guide the motor vehicle, I provide a flanged wheel 41 for engaging that edge of the pavement which is to the left of the center and this wheel is carried by a yoke 42 having its limbs adjustably supported in the sockets 43 of brackets 44 attached to one of the wheels at the front of the vehicle, as shown in Figure 1.

Thus it will be seen that by placing the guide wheel 41 in engagement with a side edge of the pavement and adjusting the parts to place the nozzle and the brushes over the center of the highway, when the apparatus is started, the pump will force the heated asphalt or other material from the tank through the nozzle upon the central part of the highway and thus provide a stripe of approximately six inches in width to mark the center of the highway. By using this nozzle and the spray means, with the pump for forcing the material with considerable force through the nozzle, the asphalt will penetrate the road surface to such an extent as to keep the asphalt from peeling off.

I also provide a by-pass pipe 45 which connects the tank to the pipe 16, adjacent the point where the pipe 16 leaves the pump, and this by-pass contains a valve 46, so that by adjusting this valve 46 and the valve 19, the desired amount of asphalt can be supplied to the nozzle, the excessive amount of asphalt entering the pipe 16 from the pump flowing back into the tank through the by-pass.

When the apparatus is not in use, the arms 29 and 30, with the carrier, can be swung upwardly and then the bolts 31 tightened to hold the spraying apparatus above the road, the pipe 16 being disconnected by the slip joint 17 in order to permit this movement of the parts. The carrier can be used with or without the wheels 25, as desired or found necessary. If desired, an auxiliary motor can be used for operating the device and where it is not desired to run the apparatus from the power plant of the vehicle. Also, when desired, a compressor assembly can be mounted on the vehicle and the air therefrom lead to the brush assembly to blow dust from the central part of the highway after the dirt has been loosened by the brush assembly.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. An apparatus of the class described comprising a motor vehicle including steerable wheels, a tank containing asphalt carried thereby, means for heating the tank, a pump, means for driving the same from the power plant of the vehicle, means for connecting the pump to the tank, an outwardly extending arm at one side of the vehicle, a frame at the outer end of the arm, a depending nozzle carried by the frame, means for connecting the nozzle to the pump, brush means in front of the nozzle carrying frame, means for supporting the same from the vehicle, and guide means adjustably connected to a front wheel of the vehicle and engaging an edge of a highway and located at that side of the vehicle opposite the side which carries the nozzle assembly, said guide means consisting of a frame secured to a stationary part of a motor vehicle and projecting laterally therefrom with one of the steerable wheels of the vehicle operating therein, and a flanged roller at the outer end of the frame.

2. An apparatus of the class described comprising a motor vehicle including steerable wheels, a tank containing asphalt carried thereby, means for heating the tank, a pump, means for driving the same from the power plant of the vehicle, means for connecting the pump to the tank, an outwardly extending arm at one side of the vehicle, a frame at the outer end of the arm, a depending nozzle carried by the frame, means for connecting the nozzle to the pump, brush means in front of the nozzle carrying frame, means for supporting the same from the vehicle, and guide means adjustably connected to a front wheel of the vehicle and engaging an edge of a highway and located at that side of the vehicle opposite the side which carries the nozzle assembly, said guide means consisting of a frame secured to a stationary part of a motor vehicle and projecting laterally therefrom with one of the steerable wheels of the vehicle operating therein, and a flange roller at the outer end of the frame, said frame consisting of a pair of socket structure secured to the stationary portion of the vehicle, a V-shaped member having parallel extensions for disposition into the socket members, retaining means on the socket members for engaging the said extensions, said flanged wheel being mounted on the apex of the said V-shaped member.

ROBERT BOWDEN.